UNITED STATES PATENT OFFICE.

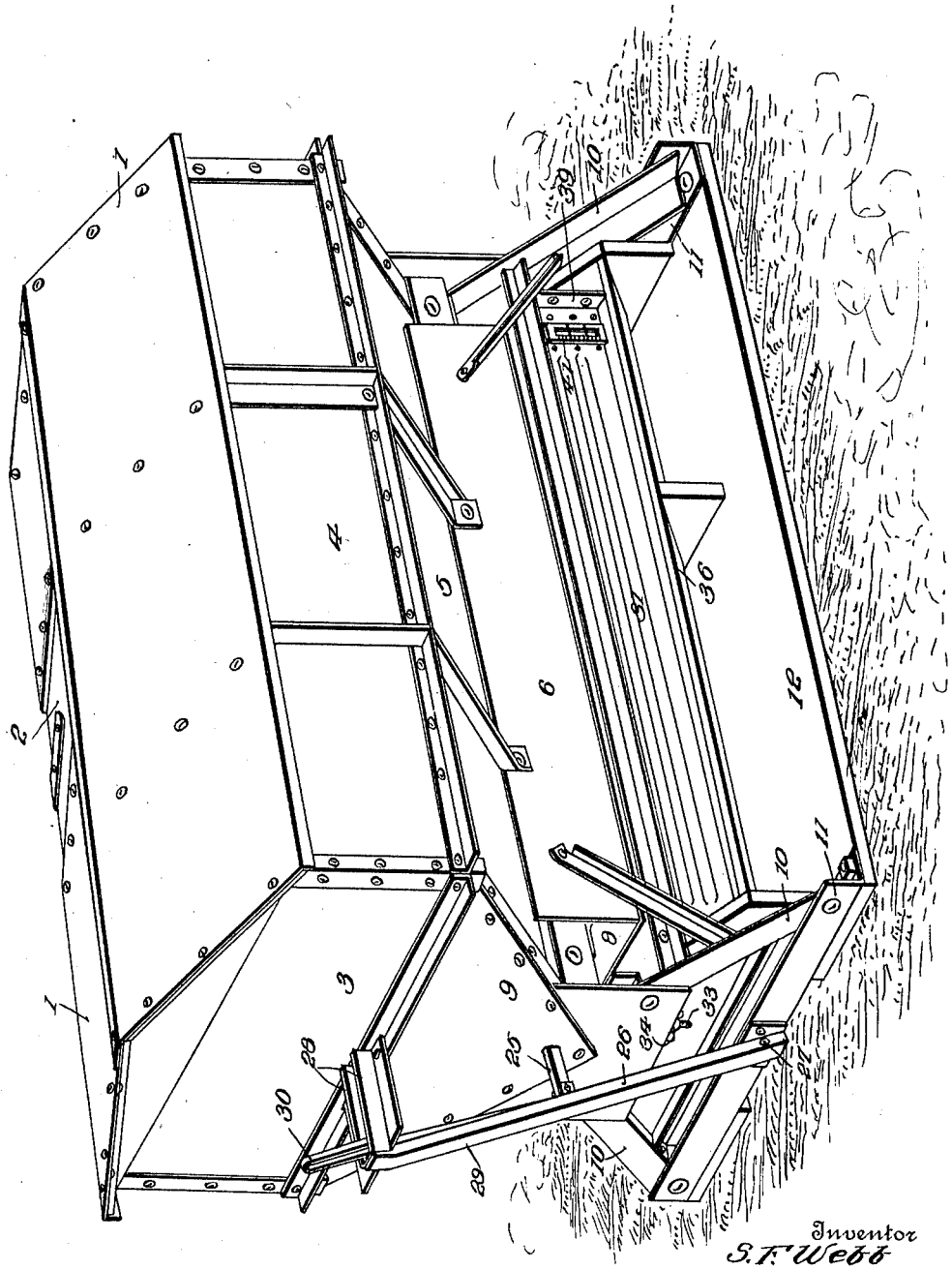

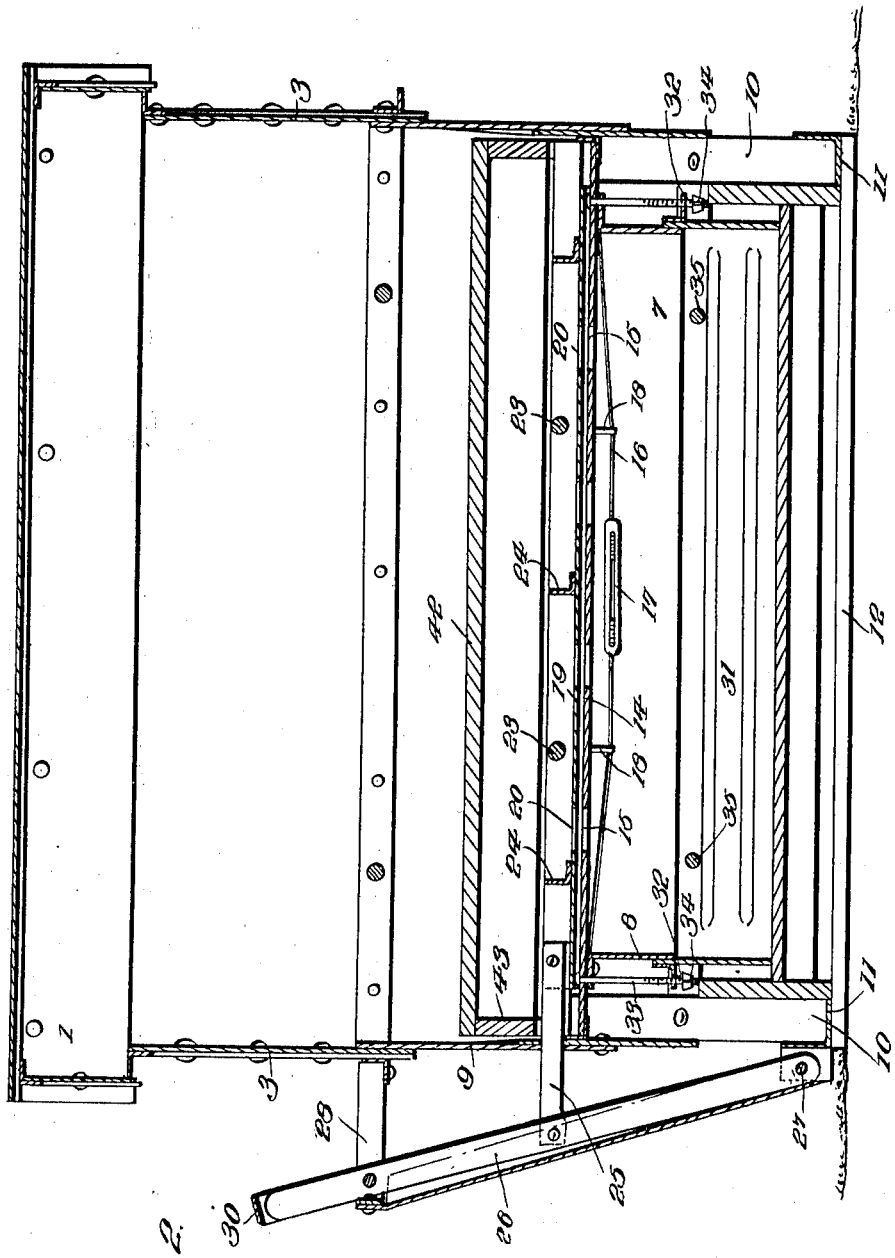

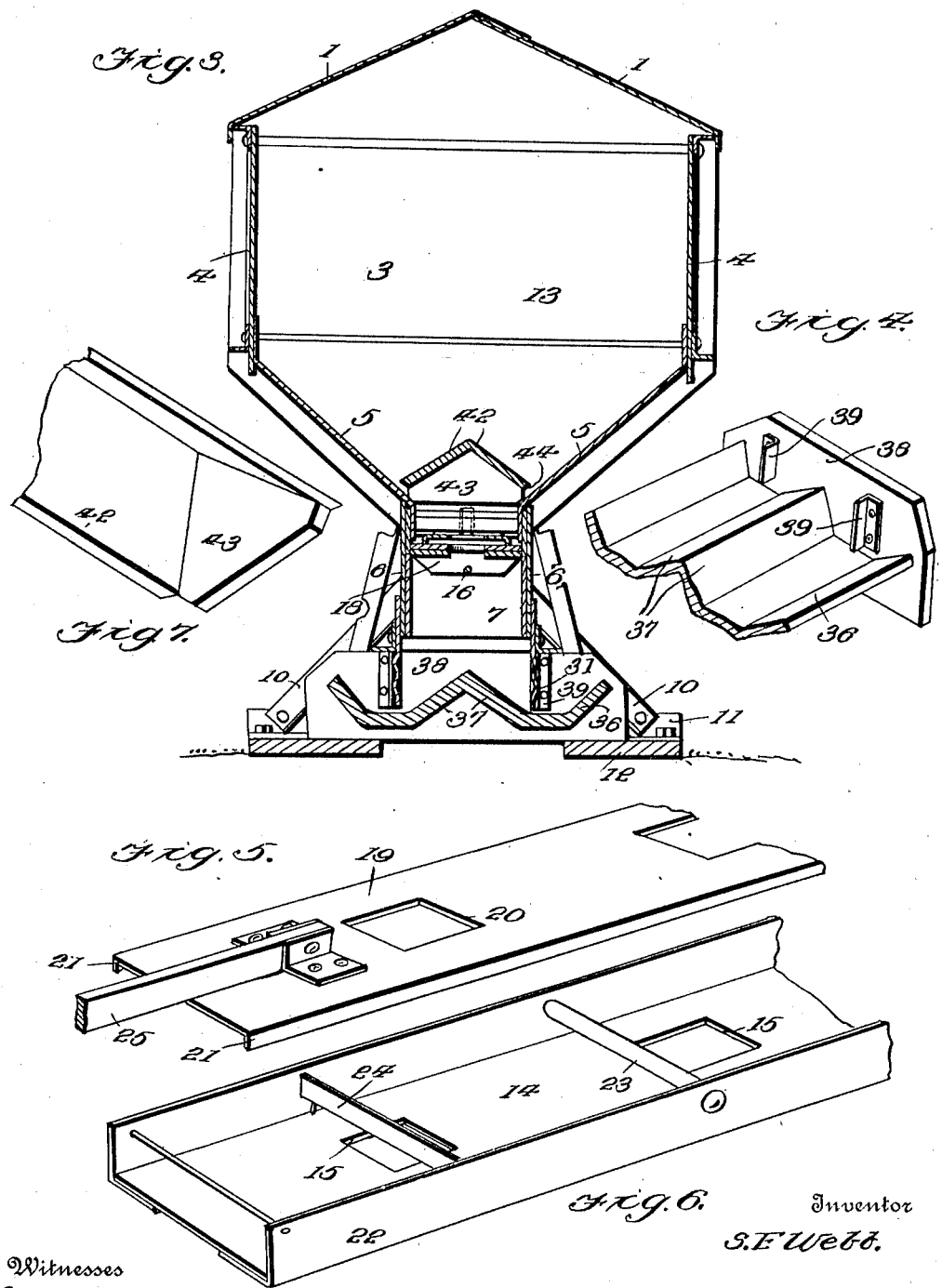

SAMUEL F. WEBB, OF WICHITA, KANSAS.

STOCK-FEEDER.

1,061,710.  Specification of Letters Patent.  Patented May 13, 1913.

Application filed June 23, 1911. Serial No. 634,965.

*To all whom it may concern:*

Be it known that I, SAMUEL F. WEBB, citizen of the United States, residing at Wichita, in the county of Sedgwick and State of Kansas, have invented certain new and useful Improvements in Stock-Feeders, of which the following is a specification.

It is manifest that the chances of the successful raising of stock are greatly enhanced if the stock raiser at all times properly proportions the feed to the number, age, and condition of the animals and that the stock raiser or farmer, to be successful, should not only know just how much feed he is using, so that the expenditures may be properly offset against the incomes, but should so feed the hogs, sheep, or the like that the food will be kept clean and in a sanitary condition, which is of course impossible if it be strewed promiscously on the ground or in an open trough where the animals will not only be permitted to overfeed, but will tread down and otherwise foul the feed and render it unfit for consumption from a hygienic standpoint.

With a knowledge of these conditions, my present invention has for its primary object an improved stock feeder by the use of which a relatively large quantity of corn, for instance, can be stored and fed in predetermined amounts from time to time down into a trough which is embodied in the device, the amount of feed being capable of proper regulation by the use of the device and the food being kept at all times free from becoming foul.

With this and other objects in view as will more fully appear as the description proceeds, the invention consists essentially in a storage bin for grain, embodying a trough at the bottom of the bin, means for permitting predetermined and readily ascertained quantities of the grain to pass by gravity from the main storage portion of the bin into a lower discharging compartment thereof and thence on to a trough, means for preventing the weight of the relatively large quantity of grain in the main storage portion of the receptacle or bin from weighing down so heavily upon the cut-off as to render difficult the manual actuation of the cut-off, and simple and efficient means for moving the cut-off and for regulating the amount of feed permitted to enter those portions of the feed trough that are accessible to the animals, thereby enabling their appetites to be properly controlled and preventing overfeeding.

The invention also consists in a storage bin of this character provided with a cut-off slide separating the main storage compartment from the discharging compartment underneath, and an improved construction of discharging compartment which embodies a relatively stationary section and a vertically adjustable section surrounding and telescoping upon the relatively stationary section, whereby the adjustable section may be raised or lowered to the desired degree relative to the feed trough underneath, so as to permit the desired amount of grain to flow from underneath or out of the discharging section into the opposite sides of the trough. And the invention also consists in certain constructions, arrangements and combinations of the parts that I shall hereinafter describe and claim.

For a full understanding of the invention reference is to be had to the following description and accompanying drawings, in which:

Figure 1 is a perspective view of a stock feeder constructed in accordance with my invention; Fig. 2 is a longitudinal sectional view thereof; Fig. 3 is a transverse sectional view; Fig. 4 is a fragmentary perspective view of the trough; Figs. 5 and 6 are similar views of the cut-off slide and the channeled frame in which it is mounted for movement; and Fig. 7 is a perspective view of a portion of a pressure relieving device mounted in the main storage compartment of the stock feeder and arranged to prevent the large mass of corn or the like from pressing so heavily upon the cut-off below as to render difficult the actuation of the latter.

Corresponding and like parts are referred to in the following description and indicated in all the views of the accompanying drawings by the same reference characters.

My improved stock feeder comprises a storage bin for grain, said bin being preferably provided with a sloping roof 1 designed to shed rain, said roof being provided at any convenient point with an opening normally closed by a water-tight slide 2, the opening being designed to admit of the bin being filled. The sloping roof 1 is connected to vertical end walls 3 and to vertical side walls 4, the latter at their lower portions converging inwardly, that is, sloping inwardly and downwardly, as indicated at 5, and merging at their lower edges into the opposite vertically disposed and longitudinally elongated side walls 6 of a discharging compartment 7. The ends of the discharging compartment 7 are closed by end walls 8 that are separated from the adjoining downward continuations 9 of the end walls 3, as best illustrated in Figs. 1 and 2. All of these parts are braced by angle bars and the like, as shown, the bracing including upwardly converging end bars 10 which are connected at their lower ends to transverse sills 11, the latter in turn being connected to and supported upon a base or platform 12. It will thus be seen that the bin is divided into a relatively large upper storage compartment 13 and a lower smaller compartment 7, said two compartments being separated from each other by a preferably channeled frame 14, a portion of which is illustrated in detail in Fig. 6, said frame being formed with any desired number and size of feed openings 15 extending therethrough. Preferably, the frame 14 is braced by arched strut rods 16 held under the required tension by turn-buckles 17 connecting together their adjoining ends, as best illustrated in Fig. 2, the brace rods passing over transversely extending brace bars 18, shown in edge view in Fig. 2 and one of them shown in side view in Fig. 3.

By reference to Fig. 3 it will be noted that the channeled frame 14 has its sides disposed between the vertical side walls 6 of the discharging compartment and the depending ends of the converging walls 5 of the storage compartment, so that single fastening devices will secure all three members, and the channeled guide frame will be firmly supported. In order to still further support the said frame and to reinforce the walls 6, additional longitudinal plates are secured to the inner faces of the said vertical walls with their upper edges bearing against the bottom of the channeled guide frame, as clearly shown in said Fig. 3.

Co-acting with and mounted in the channeled frame 14 is a cut-off slide 19, the same being formed with feed openings 20, preferably of the same number and coextensive with the openings 15 with which they are designed to register. In the present embodiment of the invention the cut-off slide 19 is in the form of an inverted channel, the free edges of the side flanges 21 resting upon the upper surface of the bottom of the frame 14. The side flanges 22 of the frame are preferably braced by tie-rods 23 and angle bars 24, the same being spaced from the bottom of the frame so as to provide the retaining devices under which the slide 19 passes, whereby said slide is properly held to its place.

The slide 19 is pivotally connected near one end to one end of a link 25, the outer end of the link being in turn connected to a hand lever 26 fulcrumed as at 27. The upper free end of the hand lever 26 is mounted for a guiding movement in between channel-bars 28 connected at one end to the end of the storage bin and at their opposite ends to the upper end of an obliquely extending channeled brace 29. The upper handle end of the lever 26 is provided with a pivot arm 30 which is adapted to swing forwardly or backwardly in between the bars 28, whereby to hold the lever locked in either closed or open position. Obviously, by drawing the lever out to a greater or less extent, the registry of the openings 20 and 15 may be made to the required extent, according to the amount of grain it is desired shall be fed through the openings from the storage compartment 13 down into the discharging compartment 7, or the lever may be locked fully closed or opened to the fullest extent.

In addition to the relatively stationary section of the feeding compartment that is composed by the side walls 6 and end walls 8, said compartment embodies a vertically adjustable section or hood 31 which entirely surrounds the upper relatively stationary section of the discharging compartment and which telescopes upon the same, as clearly illustrated in Figs. 2 and 3. In order to vertically adjust the regulating section 31 of the discharging compartment, the end walls of the section 31 are provided with outwardly projecting ledges 32 (see Fig. 2), and suspension rods 33 pass through said ledges and are provided at their lower threaded ends with adjusting nuts 34, the upper ends of the rods 33 being secured in any desired way to some stationary portion of the housing or framework, whereby, by turning the nuts 34 the relative height of the section 31 may be varied. Preferably the section 31 is braced by transverse rods 35.

Underneath or at the bottom of the discharging compartment 7, a preferably double trough 36 is mounted, the same being supported upon the base or platform 12 and being provided with two feed compartments that are separated by an oppositely beveled intermediate portion 37 designed to direct the corn outwardly on both sides as it flows from the discharging compartment, whereby it may be secured by the feeding animals. The end bars 38 of the trough 36 preferably have secured to them angle guides 39 in between which the vertically adjustable regulating section 31 of the discharging compartment is fitted to move. In order to ascertain how many pecks or bushels are fed into the exposed portion of the trough, I provide any suitable construction of gage, such as that indicated at 41 in Fig. 1, the same being secured opposite a cut-away portion of the vertically adjustable section 31 and held in a stationary manner, whereby the raising of said section will show a proportionate increase in the amount of grain fed into the trough.

In order to relieve the cut-off slide 19 from the weight of the entire mass of grain in the upper storage compartment 13 of the bin, I provide a pressure relieving device, embodying longitudinally extending and oppositely beveled outwardly and downwardly sloping walls 42 the side edges of which are supported in spaced relation to the lower converging side edges of the lower portion 5 of the side walls 4 by supporting end blocks 43 which rest upon said walls, as indicated best in Figs. 2 and 3. It will be readily seen that as the beveled walls 42 extend across the upper end of the discharging compartment so as to completely cover the same, neither the slide 19 nor the frame 14 will be called upon to support the weight of the great body of grain within the storage compartment, so that buckling or choking of the same will be effectually overcome. On the other hand, the edges of the beveled portions 42 being spaced from the converging side walls of the storage compartment, slight openings are provided which will permit the passage of sufficient grain to properly feed the stock, and the slight amount of grain which will collect upon the cut-off or slide will be insufficient to interfere in any way with its successful operation.

From the foregoing description in connection with the accompanying drawings, the operation of my improved stock feeder will be apparent. In the practical use of the device, it being understood that a quantity of corn or the like is housed within the main upper compartment 13 of the bin, the actuating lever 29 is adjusted to the required degree so as to permit the desired amount of grain to feed downwardly by gravity around the side edges of the device 42 and through the openings 20 and 15 into the discharging compartment 7, from which the corn will flow downwardly from the beveled intermediate walls 37 of the trough 36 and thus pass outwardly from underneath the lower edge of the section 31 which has been adjusted vertically to the required extent, the grain being thereby rendered accessible, and only to the predetermined amount. Thus it will be noted that by the use of the device, not only can the stock raiser determine just how much grain he is feeding to his hogs or other live stock, but the construction of the device insures that the animals cannot tread into or otherwise spoil the corn, as they are wont to do when the feed is strewn promiscuously on the ground or deposited in an entirely open trough.

Having thus described my invention, what is claimed as new is:—

1. A stock feeder comprising a bin provided with a storage compartment, a lower discharging compartment, and a subjacent trough into which the discharging compartment opens, the discharging compartment embodying a relatively stationary upper section and a lower vertically adjustable telescoping section which in the upper adjusted positions of said telescoping section has its lower edge entirely free from the bottom of the trough, the trough having an oppositely and outwardly beveled bottom within the discharging compartment and opening directly thereinto, ledges projecting from the ends of the telescoping section, suspension rods secured above said section and passing through said ledges, supports adjustably mounted on the suspension rods and bearing against the under sides of the ledges, and means for controlling the communication between the storage and discharging compartment therebelow.

2. A stock feeder comprising a bin provided with a storage compartment, the lower side walls of which converge downwardly, a lower discharging compartment having vertical side walls, depending from the converging walls and a subjacent trough into which the discharging compartment opens, the discharging compartment consisting of an upper relatively stationary section and a lower vertically adjustable telescoping section, a vertically adjustable connection between the ends of the vertically adjustable telescoping section and the supports therefor, guides for said section on the ends of the trough, and means for controlling the communication between the storage compartment and the discharging compartment therebelow.

3. A stock feeder comprising a storage compartment having downwardly converging side walls, a discharging compartment having vertical side walls leading from the lower ends of the said converging side walls, a feeding trough at the lower end of the discharging compartment and communicating therewith, a cut-off within the discharging compartment near the upper end thereof to control the flow therethrough, and a deflector arranged within the storage compartment over and immediately adjacent the lower end thereof and having its edges spaced slightly from the downwardly converging side walls of said compartment.

In testimony whereof, I affix my signature in presence of two witnesses.

SAMUEL F. WEBB. [L. S.]

Witnesses:
 JESSE A. RODGERS,
 C. C. MERRY.

---

Copies of this patent may be obtained for five cents each, by addressing the "Commissioner of Patents, Washington, D. C."